(12) United States Patent
Dawkins et al.

(10) Patent No.: US 7,834,130 B2
(45) Date of Patent: Nov. 16, 2010

(54) PROCESS FOR THE PRODUCTION OF POLYBENZIMIDAZOLE FROM A TETRAMINOBIPHENYL AND AN ISOPHTHALIC ACID

(75) Inventors: Bobby G. Dawkins, Charlotte, NC (US); J. Dean Baker, Rock Hill, SC (US)

(73) Assignee: PBI Performance Products, Inc., Charlotte, NC (US)

( * ) Notice: Subject to any disclaimer, the term of this patent is extended or adjusted under 35 U.S.C. 154(b) by 865 days.

(21) Appl. No.: 11/677,695

(22) Filed: Feb. 22, 2007

(65) Prior Publication Data

US 2008/0207869 A1    Aug. 28, 2008

(51) Int. Cl.
C08G 73/18 (2006.01)
C08G 69/00 (2006.01)
C08F 2/00 (2006.01)

(52) U.S. Cl. ............... 528/327; 528/310; 528/335; 528/336; 528/337; 528/339; 528/340; 528/342; 528/348; 528/353

(58) Field of Classification Search .......... 528/327, 528/310, 335, 336, 337, 339, 340, 342, 348, 528/353
See application file for complete search history.

(56) References Cited

U.S. PATENT DOCUMENTS

| | | | |
|---|---|---|---|
| 3,174,947 A | 3/1965 | Marvel et al. | |
| RE26,065 E | 7/1966 | Marvel et al. | |
| 3,433,772 A | 3/1969 | Chenevey et al. | |
| 3,509,108 A | 4/1970 | Prince | |
| 3,551,389 A | 12/1970 | Prince | |
| 3,655,632 A | 4/1972 | Ohfuji et al. | |
| 4,312,976 A | 1/1982 | Choe | |
| 4,431,796 A | 2/1984 | Choe et al. | |
| 4,452,967 A | 6/1984 | Conciatori et al. | |
| 4,588,808 A | 5/1986 | Ward | |
| 4,672,104 A | 6/1987 | Ward | |
| 4,717,764 A | 1/1988 | Ward | |
| 7,038,007 B2 | 5/2006 | Dawkins et al. | |
| 7,060,782 B2 | 6/2006 | Dawkins et al. | |

OTHER PUBLICATIONS

Eui-Won Choe, "Catalysts for the Preparation of Polybenzimidazoles," Journal of Applied Polymer Science, John Wiley & Sons, Inc., p. 497-506, (Jan. 18, 1994).

Primary Examiner—Duc Truong
(74) Attorney, Agent, or Firm—Hammer & Associates, P.C.

(57) ABSTRACT

A single-stage melt polymerization process is demonstrated for production of a polybenzimidazole which comprises the following steps. First, a high intensity reactor having a means for controlling agitation and rate of, atmosphere, and temperature is provided. Second, the high intensity reactor is degassed and filled with nitrogen. Third, a tetraminobiphenyl (TAB), compound A and an isophthalic acid (IPA), compound B are provided. Fourth, the high intensity reactor is charged with compounds A and B. Fifth, compound A and compound B are reacted under high intensity agitation in an absence of catalyst, to temperature of between 340° C. to 430° C. to produce a polybenzimidazole having an IV of at least 0.45 and a plugging value of greater than or equal to 1.0 g/cm$^2$.

20 Claims, No Drawings

PROCESS FOR THE PRODUCTION OF POLYBENZIMIDAZOLE FROM A TETRAMINOBIPHENYL AND AN ISOPHTHALIC ACID

BACKGROUND OF THE INVENTION

The present invention provides a single-stage melt polymerization process for production of a high molecular weight polybenzimidazole from a tetraminobiphenyl (TAB) and an isophthalic acid (IPA), where the resulting polybenzimidazole exhibits an IV (inherent viscosity) which varies little over a large range of particle sizes.

Polybenzimidazoles (PBI) are polymers of high thermal stability and are resistant to oxidative or hydrolytic degradation. Polybenzimidazole polymers may be prepared by melt polymerizing an aromatic tetraamine and a diphenylester or an anhydride of an aromatic or heterocyclic dicarboxylic acid in a one or two-stage process; see, for example U.S. Pat. Nos. Re. 26,065; 3,174,947; 3,509,108; 3,551,389; 3,433,772; 3,655,632; 4,312,976; 4,431,796; 4,452,967; 4,588,808; 4,672,104, 4,717,764; 7,038,007; and 7,060,782. In particular, U.S. Pat. No. 3,551,389 discloses a two-stage process for the production of aromatic polybenzimidazoles, in which the monomers are heated at a temperature above 170° C. in a first-stage melt polymerization zone until a foamed prepolymer is formed. The foamed prepolymer is cooled, pulverized, and introduced into a second stage polymerization zone where it is heated again to yield a polybenzimidazole polymer product. Polybenzimidazoles also may be prepared from the free dicarboxylic acids or the methyl esters of such acids.

While polybenzimidazole (PBI) polymers have always had desirable properties, the cost of this material had been quite high due in part to the cost of the raw materials. Whether run as a one step or two stage process, polybenzimidazole (PBI) polymers are usually made from a reaction of a tetraaminiobiphenyl (TAB) and a diphenyl isophthalate (DPIP). DPIP is not inexpensive and it had been suggested that a lower cost starting material might be used.

Inherent viscosity (hereinafter "IV") is the ratio of the specific viscosity of a solution of known concentration to the concentration of solute extrapolated to zero concentration, measured in units of dL/g (deciliters/gram). Inherent or intrinsic viscosity is also called the limiting viscosity number. It is directly proportional to the polymer-average molecular weight. dL/g, IV (inherent viscosity) measure, is based on the concentration of the polymer sample tested, g/100 ml or g/deciliter. The polymer is dissolved at the 0.4% (w/v) level in 100 ml of 96.5% (+/−0.5%) sulfuric acid at 80° C. After filtering, an aliquot is measured for IV using a calibrated Cannon-Fenske capillary viscometer in a 25+/−0.1 C water bath, the flow time (sec.) of the PBI polymer solution measured vs. the dissolving solvent. IV=ln (t1/t2)/c, where the natural log of the flow time of the PBI solution (t1) over the flow time of the solvent (t2) is divided by the PBI solution concentration (c).

Plugging Value (P.V.) referred to herein is a measure of solution filterability, and is determined from the filtration rate through a fine filter paper. The PBI polymer to be evaluated is dissolved in a solvent consisting of 98% dimethylacetamide and 2% lithium chloride (DMAc/LiCl) at a known concentration of 7 to 11%. The solution is prepared by weighing the desired quantity of solvent (e.g., 93 grams) into a 250 ml glass-stoppered Erlenmeyer flask, and then weighing the desired quantity of polymer (e.g., 7 grams) into the flask. The polymer is dissolved by mixing for 2 to 4 hours. The filtration apparatus consists of a Kimpak 30 ply filter with one layer of Canton Flannel in a pressure vessel. The solution after mixing is poured into the filter chamber and 14.06 kilogram force/ square centimeter gauge (200 psig) of pressure from a nitrogen cylinder is applied. The weight of the solution that passes through the filter per area is recorded with respect to time. Data is continuously generated until either the filter is emptied or the filtration rate is very slow as a result of plugging, to less than one drop every five seconds. PV can be vital for solutioning and fiber spinning applications, but not necessarily for thermoplastic molding and film applications.

Calculation of the Plugging Value is as follows: The plugging value (PV) is expressed as grams of dry polymer per square centimeter of filter area that can be passed through the filter at 14.06 kilogram force/square centimeter gauge (200 psig) before blockage occurs where $$\frac{0.07(W-T)}{P.V.} = A$$

where 0.07=concentration of polymer solution, weight fraction PBI.

w=weight, grams, of polymer solution plus vessel
T=weight, grams, of vessel
A=area of exposed filter surface, cm$^2$.

Example 225 grams weight of vessel plus polymer solution
150 grams weight of vessel
1 cm$^2$ area of exposed filter surface $$P.V. = \frac{0.07(225-150)}{1} = 5.25 \text{ g/cm}^2$$

In a paper published by Eui-Won Choe in 1994, entitled "Catalysts for the Preparation of Polybenzimidazoles" it had been suggested that isophthalic acid (IPA) could be used to replace DPIP as a starting material. This paper demonstrated on a lab scale the feasibility of IPA as a substitute monomer. What is interesting is that in this work the catalyzed compositions tended to give higher IV and PV and the uncatalyzed system showed low IV and PV values compared to the catalyzed systems. In these experiments the criteria in which the lab samples were measured on or targeted were an IV>/=0.7 and a PV>0.5. Based on these numbers it was deemed that the uncatalyzed, one-step process, polymerization samples of IPA with TAB were below target PV values. Through experimentation with the catalyzed samples it was determined that reaction temperature must be at least 380° C. The range of temperatures ran 380° C. to 430° C., with the temperature of 400° C. considered optimal.

SUMMARY OF THE INVENTION

A single-stage melt polymerization process is demonstrated for production of a polybenzimidazole which comprises the following steps. First, a high intensity reactor having a means for controlling agitation, atmosphere, and temperature is provided. Second, the high intensity reactor is degassed and filled with nitrogen. Third, a tetraminobiphenyl (TAB), compound A and an isophthalic acid (IPA), compound B are provided. Fourth, the high intensity reactor is charged with compounds A and B. Fifth, compound A and compound B are reacted under high intensity agitation in an absence of catalyst, to temperature of between 340° C. to 430° C. to produce a polybenzimidazole having an IV of at least 0.45 and a plugging value of greater than or equal to 1.0 g/cm².

DETAILED DESCRIPTION OF THE INVENTION

A single-stage melt polymerization process for production of a high molecular weight polybenzimidazole which comprises the following steps. First, a high intensity reactor having a means for controlling agitation, atmosphere, and temperature is provided. Second, the high intensity reactor is degassed and filled with nitrogen. Third, a tetraminobiphenyl (TAB), compound A and an isophthalic acid (IPA), compound B are provided. Fourth, the high intensity reactor is charged with compounds A and B. Fifth, compound A and compound B are reacted under high intensity agitation in an absence of catalyst, to temperature of between 340° C. to 430° C. to produce a polybenzimidazole having an IV of at least 0.45 dL/g and a plugging value of greater than or equal to 1.0 g/cm².

The reaction vessel used in the instant invention is a high intensity reaction vessel. A high intensity reaction vessel has a means for agitation, a means to control temperature and a means for controlling pressure or vacuum. What sets this vessel apart from the vessel or reactor used in the standard process of Ward, U.S. Pat. No. 4,672,104 is the means for agitation tends to be more robust and is capable of agitating the prepolymer in a solid state, providing for a more homogeneous reaction and final product. These high intensity reactors include but are not limited to, rotary furnace, fluidized bed, static mixing, agitated autoclave, agitated glassware, continuous kneader reactor, opposite rotating processor, same direction rotating processors and a single or twin shaft rotating processor. These high intensity mixers can be obtained from various sources which include but are not limited to: Komax Systems Inc., Wilmington, Calif.; Koch-Glitsch, Wichita, Kans.; Carbolite, Watertown, Wis.; LIST USA, Charlotte, N.C.; Processall, Cinncinnati, Ohio; Procedyne Corp., New Brunswick, N.J. Further, it is possible to convert a standard mixing vessel to a high intensity reaction vessel by changing the agitator blades to engage most of the mixture, adding more robust and higher-torque agitation blades, using a larger or more powerful agitator motor, adding additional agitators, increasing the rotating speed (rpm), or combinations thereof.

This single-stage melt polymerization process for production of polybenzimidazole produces a polybenzimidazole where the IV varies by less than plus or minus 0.1 dL/g from particles greater than or equal to 150 microns to particles smaller than or equal to 1400 microns.

In this single-stage melt polymerization process for production of polybenzimidazole, the polybenzimidazole has a molecular weight equal to or greater than 90,000 (polystyrene equivalent grams/mole). The polystyrene equivalent molecular weight would be determined by gel permeation chromatography (GPC) or size-exclusion chromatography (SEC). The actual or absolute molecular weight is a multiple/factor of the polystyrene equivalent, which is a relative number. Also, the polymer molecular weight is dependent on and related to the polymer IV, i.e., the higher the IV, the higher the molecular weight. With knowledge or determination of certain conversion factors, the absolute molecular weight can be calculated from IV.

In this single-stage melt polymerization process for production of polybenzimidazole, it has been found that good results can be obtained by preheating the reactants prior to charging them into the vessel. Compound A is pre-heated to a temperature in the range of 200° C. to 250° C., while compound B is preheated to more than 200° C. In another embodiment compound B is heated to a temperature of between 200° C. to 310° C. In one embodiment compound B it is heated to 250° C. Compound A in one embodiment is heated to 230° C. While the reaction temperature has a wide range it has been found that good results can be obtained by keeping the reaction temperature in the range of 350° C. to 370° C.

In this single-stage melt polymerization process for production of polybenzimidazole in the absence of catalyst, the process produces no phenol by-products.

In another embodiment of the invention, a single-stage melt polymerization process is demonstrated for production of a high molecular weight polybenzimidazole, which comprises the following steps. First, a high intensity reactor having a means for controlling agitation and agitation rate, atmosphere, and temperature is provided. Second, the high intensity reactor is degassed and filled with nitrogen. Third, a tetraminobiphenyl (TAB), compound A, and an isophthalic acid (IPA), compound B, are provided. Fourth, the high intensity reactor is charged with compound B. Fifth, compound B, is heated to a temperature of more than 200° C. Sixth, compound A is pre-heated to a temperature in the range of 200 to 250° C. Seventh, the high intensity reactor is charged with the pre-heated compound A. Eight, compound A and compound B are reacted under high intensity agitation in the absence of a catalyst, to temperature of between 340° C. to 430° C. to produce a polybenzimidazole having an IV of at least 0.50 dL/g and a plugging value of greater than or equal to 1.0 g/cm².

In this single-stage alternate embodiment one may also preheat the IPA before charging it into the high intensity reactor where the temperature of the preheat is more than 200° C. In another embodiment the temperature of the preheat, would be greater than the melting point of the IPA, which is 340° C.

In this single-stage alternate embodiment melt polymerization process for production of polybenzimidazole the high intensity mixer is selected from the group of: rotary furnace, fluidized bed, static mixing, agitated autoclave, agitated glassware, continuous kneader reactor, opposite rotating processor, same direction rotating processors, and a single or twin co- and counter rotating shaft processor, batch or continuous.

This single-stage alternate embodiment melt polymerization process for production of polybenzimidazole the polybenzimidazole has an IV which varies by less than plus or minus 0.1 dL/g from particles greater than or equal to 150 microns to particles smaller than or equal to 1400 microns.

In this single-stage alternate embodiment melt polymerization process for production of polybenzimidazole the polybenzimidazole has a molecular weight equal to or greater than 90,000 (polystyrene equivalent grams/mole).

In this single-stage alternate embodiment melt polymerization process for production of polybenzimidazole in the absence of catalyst, the process produces no phenol by-products.

In this single-stage alternate embodiment melt polymerization process for production of polybenzimidazole the compound B, is heated to a temperature of between 200° C. to 310° C. In one embodiment it is heated to 250° C. Compound A in one embodiment is heated to 230° C. While the reaction temperature has a wide range it has been found that good results can be obtained by keeping the reaction temperature in the range of 350° C. to 370° C.

In another embodiment, a single-stage melt polymerization process for production of a polybenzimidazole is demonstrated, which comprises the following steps. First, a high intensity reactor having a means for controlling agitation and rate, atmosphere, and temperature is provided. Second, the high intensity reactor is degassed and filled with nitrogen. Third, a tetraminobiphenyl (TAB), compound A and an isophthalic acid (IPA), compound B are provided. Fourth, the high intensity reactor is charged with compounds A and B. Fifth, compound A and compound B are reacted under high intensity agitation with a catalyst, to temperature of between 340° C. to 375° C. to produce a polybenzimidazole having an IV of at least 0.4 dL/g and a plugging value of greater than or equal to 0.5 g/cm$^2$.

In this alternate single-stage melt polymerization process for production of polybenzimidazole the catalyst is added in an amount from 0.50% to 2.5%. The catalyst is selected from the group of: dichlorophenylphosphine, chlorodiphenylphosphine, triphenyl phosphite, diphenylphosphine oxide, dichlorodimethylsilane, diphenyl chlorophosphate, di(methoxy)phenylphosphine, triphenyl phosphate, phenyl N-phenylphosphoramidochloridate, o-phenyl phosphorochloridate, dibutoxyphenylphosphine, diphenylphosphine, o-phenylene phosphorochloridate, tris(p-methoxyphenyl)phosphine, tributyl phosphite and combinations thereof.

In this alternate single-stage embodiment melt polymerization process for production of polybenzimidazole the high intensity mixer is selected from the group of: rotary furnace, fluidized bed, static mixing, agitated autoclave, agitated glassware, continuous kneader reactor, opposite rotating processor, same direction rotating processors and a single or twin shaft rotating processor.

In this alternate single-stage embodiment melt polymerization process for production of polybenzimidazole, the polybenzimidazole has an IV which varies by less than plus or minus 0.1 dL/g from particles greater than or equal to 150 microns to particles smaller than or equal to 1400 microns.

In this alternate single-stage alternate embodiment melt polymerization process for production of polybenzimidazole the polybenzimidazole has a molecular weight equal to or greater than 90,000 (polystyrene equivalent grams/mole).

In this alternate single-stage alternate embodiment melt polymerization process for production of polybenzimidazole the compound B, is heated to a temperature of between 200° C. to 310° C. In one embodiment it is heated to 250° C. Compound A in one embodiment is heated to 230° C. While the reaction temperature has a wide range it has been found that good results can be obtained by keeping the reaction temperature in the range of 350° C. to 370° C. In another embodiment the reaction temperature is 360° C. When the reactants are preheated then the polybenzimidazole produced has an IV of at least 0.5 dL/g and a plugging value of greater than or equal to 0.6 g/cm$^2$.

EXAMPLES

TABLE A

|   | IPA | TAB | TTP | Reaction Temp | IV Final | PV Final | Color |
|---|-----|-----|-----|---------------|----------|----------|-------|
| A | X | X | X | 390° C. | 0.79 | 0.13 | 39.3 |
| B | X | X | X | 360° C. | 0.48 | 2.7 | 41.3 |
| C | X | X | X | 360° C. | 0.54 | 0.2 | 33.6 |
| D | X | X |   | 390° C. | 0.53 | 1.1 | 32.6 |
| E | X | X | X | 360° C. | 0.55 | 0.8 | 33.6 |
| F | X | X |   | 390° C. | 0.48 | 3.9 | 37.1 |

Where "Color" refers to L-color, relative to lightness/darkness.

Examples A, B, C, D the reactants where charged without preheating. In Example F the TAB was preheated to 250° C. and the IPA was preheated to 230° C.

The following are some examples of variations of IV over the particle range for polybenzimidazole made by a two stage process in accordance with U.S. Pat. No. 4,672,104.

| | PSD: | | | | |
|---|---|---|---|---|---|
| SAMPLE | Particle Size microns | WT (GM) | WT (%) | IV | PV |
| Control 1 | | | | 0.74 | 0.6 |
| | >1000 | 3.40 | 3.38 | 0.60 | |
| | 1000–710 | 3.23 | 3.21 | 0.73 | |
| | 710–425 | 8.42 | 8.37 | 0.90 | |
| | 425–300 | 11.54 | 11.47 | 0.90 | |
| | 300–150 | 57.70 | 57.37 | 0.77 | |
| | <150 | 16.29 | 16.20 | 0.64 | |
| Control 2 | | | | 0.91 | 5.1 |
| | >1000 | 7.97 | 12.85 | 1.06 | |
| | 1000–710 | 6.39 | 10.31 | 1.10 | |
| | 710–425 | 11.15 | 17.98 | 1.12 | |
| | 425–300 | 8.76 | 14.13 | 0.97 | |
| | 300–150 | 23.88 | 38.52 | 0.79 | |
| | <150 | 3.85 | 6.21 | 0.61 | |
| Control 3 | | | | 1.01 | 14.9 |
| | >1000 | 3.02 | 6.00 | 1.27 | |
| | 1000–710 | 3.62 | 7.17 | 1.35 | |
| | 710–425 | 9.39 | 18.66 | 1.39 | |
| | 425–300 | 8.68 | 17.25 | 1.16 | |
| | 300–150 | 20.39 | 40.51 | 0.92 | |
| | <150 | 5.23 | 10.39 | 0.67 | |

Where "PSD" refers to particle size distribution.

While these examples show that both good IV and PV values can be achieved, it also shows that IV within the samples tend to vary. For Control 1 (hereinafter C1) in the size range of 150 to 1000 microns shows a size swing of roughly 0.2 dL/g. For Control 2 (hereinafter C2) in the size range of 150 to 1000 microns shows a size swing of roughly 0.3 dL/g. For Control 3 (hereinafter C3) in the size range of 150 to 1000 microns shows a size swing of roughly 0.5 dL/g.

When looking at the IV over the particle distribution for the polybenzimidazole made from IPA and TAB, the IV's show far less variation over the particle size distribution (PSD). Here the particle distributions were tested for samples A, B, E and F.

| | PSD: | | | | |
|---|---|---|---|---|---|
| SAMPLE | Particle Size microns | WT (GM) | WT (%) | IV | PV |
| A | | | | 0.79 | 0.13 |
| | >1400 | 19.7 | 20 | 0.74 | |
| | 1400–1000 | 13.7 | 14 | 0.73 | |
| | 1000–710 | 10 | 10 | 0.78 | |
| | 710–425 | 12.5 | 12 | 0.79 | |
| | 425–150 | 23.7 | 24 | 0.80 | |
| | <150 | 20.6 | 21 | 0.85 | |
| | Overall | 100.2 | 100 | 0.79 | |
| B | | | | 0.48 | 2.7 |
| | >1400 | 18.9 | 20 | 0.47 | |
| | 1400–1000 | 15.8 | 15 | 0.46 | |
| | 1000–710 | 13.3 | 13 | 0.44 | |

-continued

| SAMPLE | Particle Size microns | PSD: WT (GM) | WT (%) | IV | PV |
|---|---|---|---|---|---|
|  | 710–425 | 15.7 | 15 | 0.46 |  |
|  | 425–150 | 22.5 | 22 | 0.47 |  |
|  | <150 | 17.9 | 17 | 0.47 |  |
|  | Overall | 104.1 | 100 | 0.48 |  |
| E |  |  |  | 0.55 | 0.8 |
|  | >1400 | 12.2 | 12 | 0.53 |  |
|  | 1400–1000 | 13.4 | 13 | 0.54 |  |
|  | 1000–710 | 11.6 | 12 | 0.54 |  |
|  | 710–425 | 15.8 | 16 | 0.55 |  |
|  | 425–150 | 24.4 | 24 | 0.55 |  |
|  | <150 | 23.3 | 23 | 0.55 |  |
|  | Overall | 100.7 | 100 | 0.55 |  |
| F |  |  |  | 0.48 | 3.9 |
|  | >1400 | 22.9 | 23 | 0.48 |  |
|  | 1400–1000 | 12.6 | 13 | 0.51 |  |
|  | 1000–710 | 10.0 | 10 | 0.50 |  |
|  | 710–425 | 12.9 | 13 | 0.50 |  |
|  | 425–150 | 25.8 | 26 | 0.51 |  |
|  | <150 | 16.4 | 16 | 0.52 |  |
|  | Overall | 100.6 | 100 | 0.48 |  |

What is claimed is:

1. A single-stage melt polymerization process for production of polybenzimidazole which comprises the steps of:
providing a high intensity reactor having a means for controlling atmosphere and temperature;
degassing said high intensity reactor and filling with nitrogen;
providing a tetraminobiphenyl (TAB), compound A;
providing an isophthalic acid (IPA), compound B;
charging a high intensity reactor with compounds A and B;
reacting compound A and compound B under high intensity agitation and in an absence of catalyst while heating to a temperature of between 340° to 430° C. to produce a polybenzimidazole having an IV average of at least 0.45 dL/g and a PV of greater than or equal to 1.0 g/cm².

2. The single-stage melt polymerization process for production of polybenzimidazole according to claim 1 where said high intensity mixer is selected from the group of: rotary furnace, fluidized bed, static mixing, agitated autoclave, agitated glassware, continuous kneader reactor, opposite rotating processor, same direction rotating processors, a single shaft rotating processor and a twin shaft rotating processor.

3. The single-stage melt polymerization process for production of polybenzimidazole according to claim 1 where said IV of said polybenzimidazole varies by less than plus or minus 0.1 dL/g from particles greater than or equal to 150 microns to particles smaller than or equal to 1400 microns.

4. The single-stage melt polymerization process for production of polybenzimidazole according to claim 1 where said polybenzimidazole has a molecular weight equal to or greater than 90,000 (polystyrene equivalent).

5. The single-stage melt polymerization process for production of polybenzimidazole according to claim 1 where said heating is to a temperature of between 350° to 400° C.

6. A single-stage melt polymerization process for production of polybenzimidazole which comprises the steps of:
providing a high intensity reactor having a means for controlling atmosphere and temperature;
degassing said high intensity reactor and filling with nitrogen;
providing a tetraminobiphenyl (TAB), compound A;
providing an isophthalic acid (IPA), compound B;
charging a high intensity reactor with compound B;
heating compound B to a temperature of more than 200° C.;
pre-heating compound A to a temperature in the range of 200° to 250° C.;
charging said high intensity reactor with said pre-heated compound A;
reacting compound A and compound B under high intensity agitation and in an absence of catalyst while heating to a temperature of between 340° to 430° C. to produce a polybenzimidazole having an IV average of at least 0.45 dL/g and a PV of greater than or equal to 2.0.

7. The single-stage melt polymerization process for production of polybenzimidazole according to claim 6 where said high intensity mixer is selected from the group of: rotary furnace, fluidized bed, static mixing, agitated autoclave, agitated glassware, continuous kneader reactor, opposite rotating processor, same direction rotating processors, a single shaft rotating processor and a twin shaft rotating processor.

8. The single-stage melt polymerization process for production of polybenzimidazole according to claim 6 where said IV of said polybenzimidazole varies by less than plus or minus 0.1 dL/g from particles greater than or equal to 150 microns to particles smaller than or equal to 1400 microns.

9. The single-stage melt polymerization process for production of polybenzimidazole according to claim 6 where said polybenzimidazole has a molecular weight equal to or greater than 90,000 (polystyrene equivalent).

10. The single-stage melt polymerization process for production of polybenzimidazole according to claim 6 where said process produces no phenol byproducts.

11. A single-stage melt polymerization process for production of a high molecular weight polybenzimidazole which comprises the steps of:
providing a high intensity reactor having a means for controlling atmosphere and temperature;
degassing said high intensity reactor and filling with nitrogen;
providing tetraminobiphenyl (TAB), compound A;
providing an isophthalic acid (IPA), compound B;
charging a high intensity reactor with compounds A and B;
reacting compound A and compound B under high intensity agitation with a catalyst, to temperature of between 340° C. to 375° C. to produce a polybenzimidazole having an IV of at least 0.4 and a PV of greater than or equal to 0.5 g/cm².

12. The single-stage melt polymerization process for production of polybenzimidazole according to claim 11 where said high intensity mixer is selected from the group of: rotary furnace, fluidized bed, static mixing, agitated autoclave, agitated glassware, continuous kneader reactor, opposite rotating processor, same direction rotating processors, a single shaft rotating processor and a twin shaft rotating processor.

13. The single-stage melt polymerization process for production of polybenzimidazole according to claim 11 where said IV of said polybenzimidazole varies by less than plus or minus 0.1 dL/g from particles greater than or equal to 150 microns to particles smaller than or equal to 1400 microns.

14. The single-stage melt polymerization process for production of polybenzimidazole according to claim 11 where said catalyst is added in an amount from 0.50% to 2.0%.

15. The single-stage melt polymerization process for production of polybenzimidazole according to claim 11 where said catalyst is selected from the group of: dichlorophenylphosphine, chlorodiphenylphosphine, triphenyl phosphite, diphenylphosphine oxide, dichlorodimethylsilane, diphenyl chlorophosphate, di(methoxy)phenylphosphine, triphenyl phosphate, phenyl N-phenylphosphoramidochloridate, o-phenyl phosphorochloridate, dibutoxyphenylphosphine, diphenylphosphine, o-phenylene phosphorochloridate, tris(p-methoxyphenyl)phosphine, tributyl phosphite and combinations thereof.

16. The single-stage melt polymerization process for production of polybenzimidazole according to claim 11 further comprising the steps of:
charging a high intensity reactor with compound B;
heating compound B to a temperature of more than 200° C.;
pre-heating compound A to a temperature in the range of 200° to 250° C.; and
charging said high intensity reactor with said pre-heated compound A.

17. The single-stage melt polymerization process for production of polybenzimidazole according to claim 16 where the polybenzimidazole produced has an IV of at least 0.45 and a PV of greater than or equal to 0.6 g/cm$^2$.

18. The single-stage melt polymerization process for production of polybenzimidazole according to claim 16 where said IV of said polybenzimidazole varies by less than plus or minus 0.1 dL/g from particles greater than or equal to 150 microns to particles smaller than or equal to 1400 microns.

19. The single-stage melt polymerization process for production of polybenzimidazole according to claim 16 where said catalyst is added in an amount from 0.50% to 2.0%.

20. The single-stage melt polymerization process for production of polybenzimidazole according to claim 16 where said catalyst is selected from the group of: dichlorophenylphosphine, chlorodiphenylphosphine, triphenyl phosphite, diphenylphosphine oxide, dichlorodimethylsilane, diphenyl chlorophosphate, di(methoxy)phenylphosphine, triphenyl phosphate, phenyl N-phenylphosphoramidochloridate, o-phenyl phosphorochloridate, dibutoxyphenylphosphine, diphenylphosphine, o-phenylene phosphorochloridate, tris(p-methoxyphenyl)phosphine, tributyl phosphite and combinations thereof.

* * * * *